(12) United States Patent
Kasahara et al.

(10) Patent No.: US 6,599,613 B1
(45) Date of Patent: Jul. 29, 2003

(54) PRIMITIVE DISPLAY PLATE AND METHOD OF MANUFACTURING DISPLAY PLATE AND DISPLAY APPARATUS

(75) Inventors: Sachio Kasahara, Chino (JP); Akio Magario, Nagano-ken (JP); Koichi Karasawa, Suwa (JP); Haruyuki Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 110 days.

(21) Appl. No.: 09/807,545
(22) PCT Filed: Aug. 23, 2000
(86) PCT No.: PCT/JP00/05663
§ 371 (c)(1),
(2), (4) Date: Apr. 12, 2001
(87) PCT Pub. No.: WO01/15123
PCT Pub. Date: Mar. 1, 2001

(30) Foreign Application Priority Data

Aug. 23, 1999 (JP) ............................................ 11-235803

(51) Int. Cl.⁷ ................................................ B32B 3/10
(52) U.S. Cl. ........................ 428/140; 428/195; 428/209
(58) Field of Search ................... 428/140, 195, 428/209

(56) References Cited

U.S. PATENT DOCUMENTS

| | | | |
|---|---|---|---|
| 5,462,787 A | 10/1995 | Yamamoto et al. | ......... 428/195 |
| 5,893,322 A * | 4/1999 | Schneider et al. | ............ 101/34 |
| 6,128,090 A * | 10/2000 | Hunsel et al. | ............... 356/402 |
| 6,420,016 B1 * | 7/2002 | Peternell et al. | ............ 428/195 |

FOREIGN PATENT DOCUMENTS

| | | |
|---|---|---|
| JP | 52-105866 | 9/1977 |
| JP | 57-154085 | 9/1982 |
| JP | 63-118684 | 5/1988 |
| JP | 64-28582 | 1/1989 |
| JP | 1-275048 | 11/1989 |
| JP | 7-61086 | 3/1995 |
| JP | 10-162093 | 6/1998 |
| JP | 11-326548 | 11/1999 |
| JP | 2000-111660 | * 4/2000 |
| JP | 2002-55637 | * 2/2002 |

OTHER PUBLICATIONS

"Special Printings" published Jul. 15, 1983. [Not in English].
"Introduction of Special Printing" published Aug. 15, 1983. [Not in English].

* cited by examiner

Primary Examiner—Cynthia H. Kelly
Assistant Examiner—B. Shewareged
(74) Attorney, Agent, or Firm—Mark P. Watson (57) ABSTRACT

A primitive display plate includes a supporting portion having a positioning structure formed to be positioned by engagement with another member, a display plate shape portion formed to have a predetermined positional relation to the positioning structure and to have the planar shape of a display plate to be manufactured, and a connecting portion for integrally connecting the display plate shape portion and the supporting portion, and wherein an ink-receiving layer is formed on the surface of the display plate shape portion, for holding the received ink droplets thereby.

7 Claims, 7 Drawing Sheets

PRIMITIVE DISPLAY PLATE AND METHOD OF MANUFACTURING DISPLAY PLATE AND DISPLAY APPARATUS

TECHNICAL FIELD

The present invention relates to a primitive display plate and a method of manufacturing a display plate, and a method of manufacturing a display apparatus, and particularly to a manufacturing technique suitable for manufacturing a timepiece dial.

BACKGROUND ART

In general, in manufacturing a wristwatch, a desired surface pattern (including numeric characters, characters, time scales, etc.) is formed in a predetermined design on the surface of a metal plate by coating, printing or surface treatment, and separated in a predetermined shape to form a dial. The dial is then attached to a timepiece movement, and finally set in a watch case. As a method of forming the desired surface pattern on the dial, pad printing, screen printing, offset printing, and the like, which are described in Special Printing (written by Kazuo Matsumoto, issued by Insatsu Shuppan Kenkyusho), Introduction to Special Printing (written by Ichiro Ikeda, issued by Society of Printing, Editing Section), etc. are frequently used. In these printing methods, a block copy is created by a photomechanical technique and is used for each print color.

However, the conventional method of forming a dial is suitable for forming a great number of dials having a predetermined design, but in multi-kind and small-quantity production, which has been recently increasingly required, the method requires the creation of a plate at each change of the design, thereby increasing the production cost and requiring more time before the start of production. Thus it requires, at least, about 1 to 2 weeks before the delivery date. Particularly, a watch provided with an original pattern has been recently increasingly required. In this case, the number of the products is small enough to further increase the production cost per product, and delivery of a watch having a dial having a required pattern within a short time is very difficult because more time is required for forming a plate.

In displaying a character on the dial, in some cases, many plates are needed because five colors or more are required, thereby inevitably increasing the production cost and delaying the delivery date. Particularly, in printing after the formation of each of the dial shapes, more time is required for positioning a plurality of plates and a dial, and color matching, thereby requiring a skilled worker.

Furthermore, in printing on the dial, a general-purpose printing apparatus cannot be easily used, thus an expensive special machine is required, and an installation place for the special machine must be secured, causing the need for steps taken against noise and dust during an operation of the machine. In addition, the printing step requires the use of a printing ink using an organic solvent and a cleaning solution, thereby requiring environmental measures and safety and health measures and creating heavy incidental equipment costs.

Accordingly, the present invention has been achieved for solving the above problems, and an object of the present invention is to provide a novel primitive display plate, and methods of manufacturing a display plate and a display apparatus, which are capable of rapidly manufacturing a display plate having a surface pattern having a required design and a display apparatus comprising the display plate as various display plates such as a watch dial, which are capable of minimizing an increase in the manufacturing cost by a simple work process, and which are capable of decreasing equipment cost.

DISCLOSURE OF INVENTION

In order to achieve the object, a primitive display plate of the present invention comprises a supporting portion comprising a positioning structure formed to be positioned by engagement with another member, a display plate shape portion formed to have a predetermined positional relation to the positioning structure and having the planar shape of a display plate to be manufactured, and a connecting portion for connecting the display plate shape portion and the supporting portion, which are integrally provided, wherein an ink-receiving layer is formed on the surface of the display plate shape portion, for holding received ink droplets thereby.

In the present invention, the supporting portion having the positioning structure, and the display plate shape portion comprising the ink-receiving layer provided on the surface thereof are connected through the connecting portion to permit ink jet system printing in which ink droplets are ejected onto the display plate shape portion on the basis of the positioning structure, and permit separation of a display plate by cutting the connecting portion after printing. Therefore, an appropriate print pattern can be formed on the surface of the display plate without using a plate, thereby permitting the rapid manufacture of the display plate while minimizing an increase in manufacturing cost even under conditions of multi-kind and small-quantity production. By using the primitive display plate, printing and cutting of the connecting portion can be carried out by general-purpose small equipment without using a special large manufacturing equipment, and thus the display plate can be manufactured in an appropriate place, thereby rapidly and flexibly complying with demands of customers.

In the present invention, the surface of the connecting portion is preferably lower than the surface of the display plate shape portion.

In the present invention, since the surface of the connecting portion is lower than the surface of the display plate shape portion, it is possible to decrease damage such as a defect, peeling, swelling in a printed pattern on the surface and a lower layer structure below the printed pattern at the edge of the display plate shape portion even by cutting the connecting portion.

In the present invention, the ink-receiving layer is preferably not formed on the positioning structure.

In the present invention, since the ink-receiving layer is not formed on the positioning structure, it is possible to decrease the possibility of deteriorating the engagement precision of the positioning structure due to the thickness of the ink-receiving layer, thereby positioning the display plate shape portion with high precision.

In the present invention, preferably, a coating layer is formed on the surface of the display plate shape portion, and the ink-receiving layer is formed on the surface of the coating layer, the ink-receiving layer being transparent or semitransparent.

In the present invention, since the ink-receiving layer is formed on the coating layer, and the ink-receiving layer is transparent or semitransparent, the color tone, the texture, etc. of the coating layer can be observed through the ink-receiving layer, and thus the color tone, the texture, etc. of the printed pattern formed by adhering ink droplets can be set in a wide range, thereby widening a variation of appearance designs of the display plate, and increasing the expressiveness of the display plate. Also, the surface of the coating layer can be formed with a color tone suitable for, for example, printing a white color (unpatterned) to improve the coloring property of the printed pattern and the reproducibility of the color tone, whereby the color tone and pattern having high quality can be formed.

In the present invention, the positioning structure preferably comprises a through hole formed in the supporting portion.

In the present invention, since the positioning portion comprises a through hole, positioning can easily be performed with high precision by simple positioning means such as a pin.

In the present invention, with the ink-receiving layer comprising a porous surface, in some cases, the ink-receiving layer comprises a material having high absorbency for the ink droplets.

The primitive display plate of the present invention is preferably formed from a shaped substrate. By using the shaped substrate, i.e., the substrate having a predetermined outer shape, a common positioning jig or an apparatus having a common structure can be ordinarily used, and thus the display plate shape portion can be easily handled in the printing step and the step of cutting the connecting portion, thereby decreasing the manufacturing cost.

A method of manufacturing a display plate of the present invention comprises: processing a primitive plate including a supporting portion comprising a positioning structure formed to be positioned by engagement with another member on the basis of the positioning portion to form a display plate shape portion having the planar shape of a display plate to be manufactured and a connecting portion for connecting the display plate shape portion to the supporting portion; forming an ink-receiving layer on the surface of the display plate shape portion; ejecting and adhering a plurality of ink droplets to the ink-receiving layer on the basis of the positioning structure to form a surface pattern corresponding to a desired image pattern; and cutting the connecting portion to separate the display plate.

In the present invention, the ink-receiving layer is preferably not formed on the positioning structure.

In the present invention, the surface of the connecting portion is preferably lower than the display plate shape portion.

In the present invention, the image pattern is preferably input to a computer or stored in the computer, output data is formed with correspondence between electronic data corresponding to the image pattern and the position data corresponding to the display plate shape portion to transmit the output data from the computer to an ink jet printing apparatus which can print a predetermined pattern by ejecting the ink droplets and which can perform positioning by engagement with the positioning structure so that the ink jet printing apparatus is driven according to the output data to form the surface pattern on the display plate shape portion with the positioning structure engaged with the positioning portion.

In the present invention, an appropriate image pattern can be printed on the display plate shape portion according to the desire of a manufacturer or a customer by the ink jet printing apparatus without using a conventional plate, whereby an increase in the manufacturing cost can be prevented even in small-quantity production, and the display plate can be rapidly manufactured with the desired printed pattern. In addition, the printed pattern is positioned relative to the display plate shape portion by using the position data input from the computer, and thus a positioning work can easily be carried out during printing only by engaging the positioning structure with the positioning portion of the ink jet printing apparatus, thereby avoiding complexity of the work.

In the present invention, position and shape data of the display plate shape portion is preferably input to the computer or stored in the computer so that the image data is superposed on the display plate shape displayed on the basis of the position and shape data to form the position data in correspondence with the electronic data corresponding to the image pattern.

In the present invention, the position data of the image pattern can be formed by superposing the desired image pattern on the position and shape data, and thus the printed pattern corresponding to the image pattern can be formed in the desired size at the desired position according to the desire of the worker in the manual method of superposing both patterns, and formed in the desired size at the desired position previously set under predetermined conditions in the automatic method of superposing both patterns. Furthermore, printing can be performed after the superposed state is recognized, and thus the finished state can be previously estimated, thereby manufacturing a display plate according to demand.

In the present invention, a first image component and a second image component, which are separately obtained or formed, are preferably superposed and synthesized by the computer to form the image pattern.

In the present invention, since an original image pattern of the printed pattern of the display plate is formed by superposing and synthesizing the first image component and the second image component using the computer, one or a plurality of shaped patterns can be superposed on any other desired pattern to easily edit the printed pattern of the display plate. For example, in manufacturing a timepiece dial as the display plate, a functional pattern comprising numerical characters for time display, other characters, scales, logos, etc. is previously set as the shaped pattern, and a decorative pattern comprising a picture or the like as any desired pattern is superposed on the shaped pattern so that the printed pattern of the dial can be formed by a simple operation.

In the present invention, preferably, the position and shape data of the display plate shape portion is input to or stored in the computer, and the first image component and the second image component are superposed on and synthesized with the display plate shape formed based on the position and shape data to form the image pattern and the position data in correspondence with the electronic data corresponding to the image pattern.

A method of manufacturing a display apparatus of the present invention comprises: forming a display plate by the method of manufacturing a display plate; and incorporating the display plate in an apparatus.

In this case, preferably, the steps for the formation of the ink-receiving layer on the primitive plate are carried out in a manufacturing place such as a factory, and the primitive plate is transferred to a sales base such as a sales center or a store so that the image pattern is formed or selected in the sales base, and printing is also performed in the sales base.

A primitive display plate of the present invention has the above-described construction and is used as a timepiece dial.

A primitive display plate of the present invention has the above-described construction and is used as a date dial of a timepiece.

A primitive display plate of the present invention has the above-described construction and is used as a day-of-week dial of a timepiece.

In the present invention, the timepiece dial, the date dial permitting display of dates through a window provided on the dial, or the day-of-week dial permitting display of day of the week through the window provided on the dial is formed by using the primitive display plate having the above construction to permit the formation of an appropriate printed pattern on the surface of the watch display plate without using a conventional plate, whereby the watch dial, the date dial of a watch, or the day-of-week dial of a watch can be easily and rapidly manufactured while keeping down the manufacturing cost even under conditions of multi-kind and small-quality production.

BEST MODE FOR CARRYING OUT THE INVENTION

A primitive display plate, a method of manufacturing a display plate, and a method of manufacturing a display apparatus in accordance with an embodiment of the present invention will be described in detail below with reference to the attached drawings.

Figure 1A:
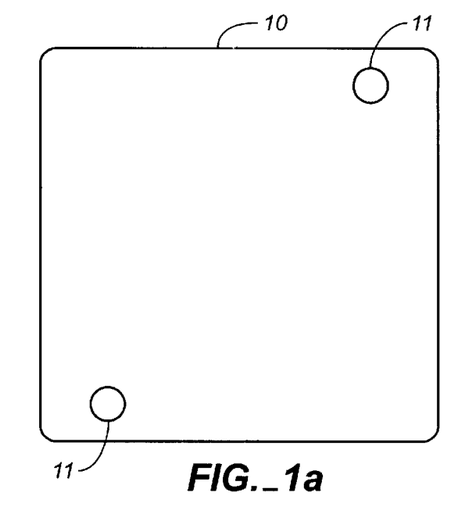
FIGS. 1(a) to (d) are plan views of a primitive display plate and a state in which ink-jet printing is performed on the primitive display plate, illustrating the steps of a process for manufacturing a primitive display plate in accordance with an embodiment of the present invention.
Figure 1B:
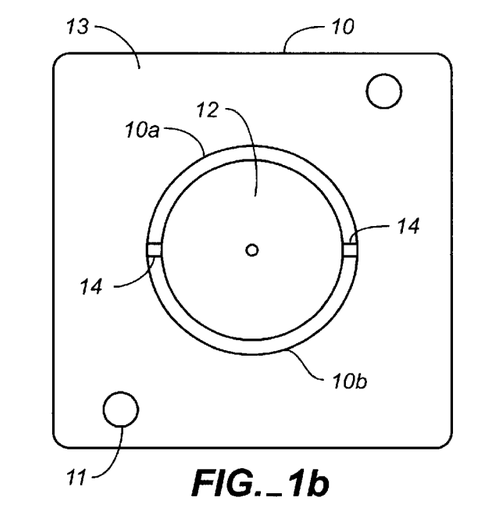
Figure 1C:
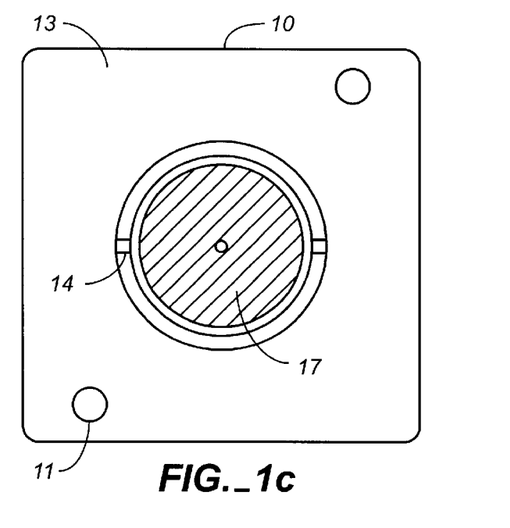
Figure 1D:
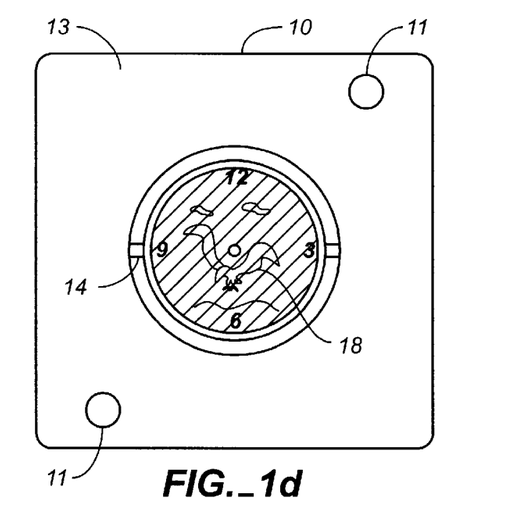

FIGS. 1(a), (b) and (c) are drawings illustrating the steps for manufacturing a primitive display plate in accordance with an embodiment of the present invention, FIG. 1(d) is a drawing illustrating the state in which printing is performed on the primitive display plate for a watch dial, and FIGS. 2(a) to (d) are sectional views illustrating the steps corresponding to FIGS. 1(a) to (d), respectively.

Figure 2A:
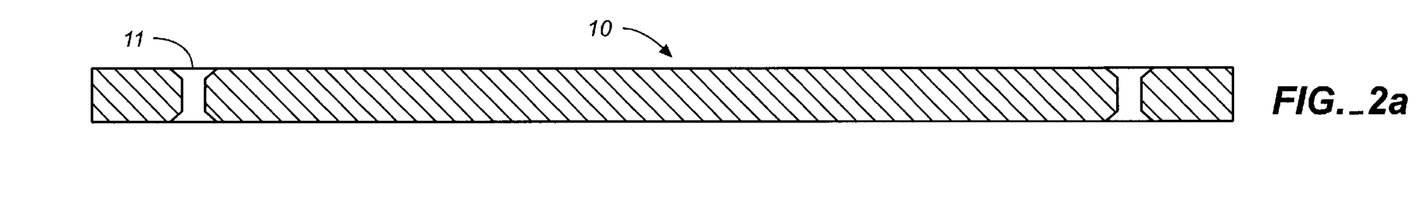
FIGS. 2(a) to (d) are sectional views of a primitive display plate and a state in which ink-jet printing is performed on the primitive display plate, illustrating the steps of the process for manufacturing a primitive display plate in accordance with the same embodiment of the present invention.

As shown in FIGS. 1(a) and 2(a), positioning pilot holes 11 are formed at predetermined positions, preferably in the periphery of a shaped substrate 10. The shaped substrate 10 can be formed by using any desired material, for example, various metal plates of aluminum, stainless steel, brass, nickel silver, and the like, hard plastic plates, ceramic plates. As shown in the drawings, the planar shape of the shaped substrate 10 is preferably a substantially rectangular shape in order to improve the handling property and positioning property. For example, the substrate generally has a 40-mm square shape having a thickness of about 0.35 mm. The pilot holes 11 constitute a positioning structure for positioning the shaped substrate 10, and preferably comprise a plurality of holes. In this embodiment, a pair of the pilot holes 11 is formed at the diagonal positions in the marginal portion of the shaped substrate 10. The pilot holes 11 are easily be formed by, for example, press stamping.

Figure 2B:
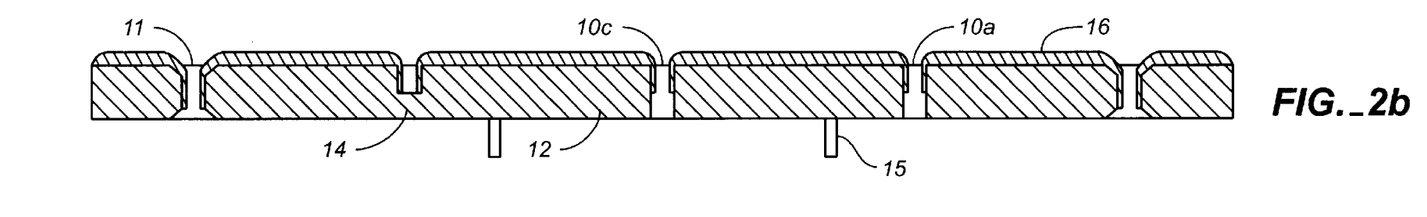

In this state, as shown in FIG. 2(b), in some cases, support legs 15 are attached to the central portion of the back of the shaped substrate 10 to project therefrom, for fixing a watch dial to the base plate of a movement which will be described later. The support legs 15 are inserted into mounting holes, which are not shown in the drawings and formed based on the formation positions of the pilot holes 11, and fixed to project from the back of the shaped substrate 10 by a method such as point welding. In a case in which another engagement structure is provided for fixing the watch dial described below to the movement (for example, when an adhesive layer is provided on the back), the support legs 15 need not be provided.

Next, predetermined processes are carried out on the shaped substrate 10 on the basis of the formation positions of the pilot holes 11. One of the processes comprises forming circular-arc slits 10a and 10b in the central portion of the shaped substrate 10 to form a display plate shape portion 12 corresponding to the planar shape of the watch dial, as shown in FIG. 1(b). The display plate shape portion 12 is connected to a supporting portion 13 including the pilot holes 11 by tie bars 14 serving as connecting portions. In this embodiment, in order to integrally and securely connect the display plate shape portion 12 and the supporting portion 13, a plurality of the tie bars 14 are preferably provided by forming a plurality of circular-arc slits in the shaped substrate 10. In the example shown in the drawings, the circular-arc slits 10a and 10b are formed to have a central angle of about 180 degrees, and a pair of the tie bars 14 are consequently provided at diagonal positions on the periphery of the display plate shape portion 12.

The tie bars 14 are then subjected to surface processing such as cutting or the like so that the surface positions thereof are lower than the surface of the display plate shape portion 12 by a step, as shown in FIG. 2(b). This processing is also carried out on the basis of the formation positions of the pilot holes 11. In the example shown in the drawings, steps are formed between the surfaces of the tie bars 14 and the surfaces of the display plate shape portion 12 and the supporting portion 13.

Then, in order to improve corrosion resistance or the appearance of the watch dial, a coating layer 16 is formed on the surface of the shaped substrate 10 by plating or coating. For example, as the coating layer 16, an anti-corrosion plated layer (for example, Ni—P electroless plating or electroplating) is formed to a thickness of 1 $\mu$m on the surface of the shaped substrate 10, and then a decorative plated layer (for example, silver electroless plating or electroplating) is formed on the anti-corrosion layer, and a transparent coating material such as acrylic clear lacquer is coated to form a transparent coating (for protecting the decorative plated layer). Alternatively, as the coating layer 16, the anti-corrosion plated layer may be formed according to demand, and then an acrylic melanine white coating material may be coated to form a white coating. By forming the white coating, a base for ink jet printing, which will be describe later, can be whitened, and a color tone having good printability can be obtained. In any case, where the shaped substrate 10 comprises an anti-corrosion material (aluminum, stainless steel, or the like), the anti-corrosion plated layer need not be provided, and an appropriate base layer may be formed for improving adhesion (or peeling resistance) of the coating layer 16 to the shaped substrate 10.

Figure 2C:
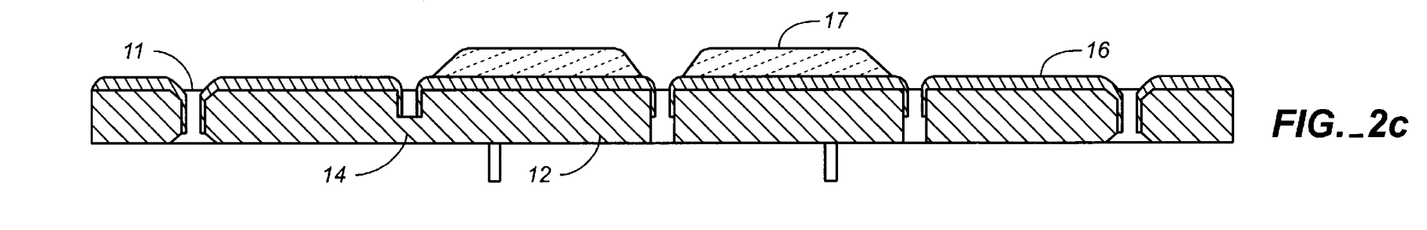

Next, an ink-receiving layer 17 shown in FIGS. 1(c) and FIG. 2(c) is formed on the surface of the display plate shape portion 12. FIG. 1(c) shows the formation region of the ink-receiving layer 17 by shadowing. As the ink-receiving layer 17, a porous layer or a water absorption layer comprising an inorganic compound or an organic compound can be used.

For example, an organometallic compound such as tetraethyl silicate, triisopropoxyaluminum is dissolved in water or alcohol-containing water to form a sol solution by hydrolysis, and the thus-formed sol solution is coated on the surface of the display plate shape portion 12, dried, and then burned to form the ink-receiving layer 17 having a porous surface. In this case, by adding an oxide fine powder of silicon oxide or the like to the sol solution, pores can be efficiently formed in the porous surface.

Alternatively, inorganic particles are dispersed in a solution formed by dissolving a water-soluble polymer in water or alcohol-containing water to form a suspension, and the thus-formed suspension is coated and then dried to form the ink-receiving layer 17. In this case, as the water-soluble polymer, starch, gelatin, gum arabic, sodium alginate, carboxymethyl cellulose, polyvinyl alcohol, polyvinyl pyrrolidone, sodium polyacrylate, polyacrylamide, polyurethane, polyester, polyvinyl acetal, or the like can be used. As the inorganic particles, silica, calcium sulfate, clay, diatomaceous earth, calcium carbonate, barium sulfate, titanium oxide, zinc oxide, titanium white, aluminum silicate, magnesium silicate, magnesium hydroxide, lithopone, alumina, zeolite, colloidal silica, colloidal alumina, or the like can be used.

In a case in which the above-described coating layer 16 is not formed, the surface of the shaped substrate 10 may be made porous by surface treatment with an appropriate chemical solution or electrolytic action, or in a case in which the coating layer 16 is formed, the coating layer 16 may be made porous by the same treatment. The surface of an aluminum substrate can be made porous by any of various methods using an electrolyte. For example, the substrate can be electrolyzed in a sulfuric acid solution using a platinum electrode as a counter electrode to obtain a fine porous surface. In this case, the ink-receiving layer 17 is formed as a surface layer of the shaped substrate 10 or of the coating layer 16.

In this embodiment, the ink-receiving layer 17 is exclusively formed only on the surface of the display plate shape portion 12. Therefore, it is possible to prevent the dimensions of the pilot holes 11 formed in the supporting portion 13 from being changed by adhesion of the ink-receiving layer 17, or surface treatment for forming the ink-receiving layer 17, thereby avoiding deterioration in the precision of 21 positioning by the pilot holes 11. This is because the fact that in forming the ink-receiving layer 17 by coating, the ink-receiving layer 17 is generally coated to a thickness of as large as about 40 to 80 μm, which may significantly deteriorate the precise shape of the pilot holes 11 if the ink-receiving layer 17 is also formed at the opening edges of the pilot holes 11. Although, in the embodiment shown in the drawings, the ink-receiving layer 17 is exclusively formed only on the surface of the display plate shape portion 12, the ink-receiving layer 17 may be formed except in the vicinities (the opening edges) of the pilot holes 11 in the supporting portion 13, i.e., on the portions of the surfaces of the display plate shape portion 12, the tie bars 14, and the supporting portion 13 except the opening edges of the pilot holes 11. As the method of partially forming the ink-receiving layer 17 as described above, screen printing can be used.

Since the ink-receiving layer 17 can be formed as a transparent or semitransparent film, the coating layer 16 formed below the ink-receiving layer 17 can be used as a color tone base for ink-jet printing which will be described below. As a material for forming the transparent or semitransparent film (the ink-receiving layer 17), for example, an aqueous solution of sodium polyacrylate in which magnesium silicate is dispersed, a coating solution formed by adding polyvinyl alcohol and water to an alumina sol, or the like can be used. In this case, the coating layer 16 is formed to have a white surface so that the same good color tone as that obtained by ink-jet printing on white paper described below can be obtained.

Figure 2D:
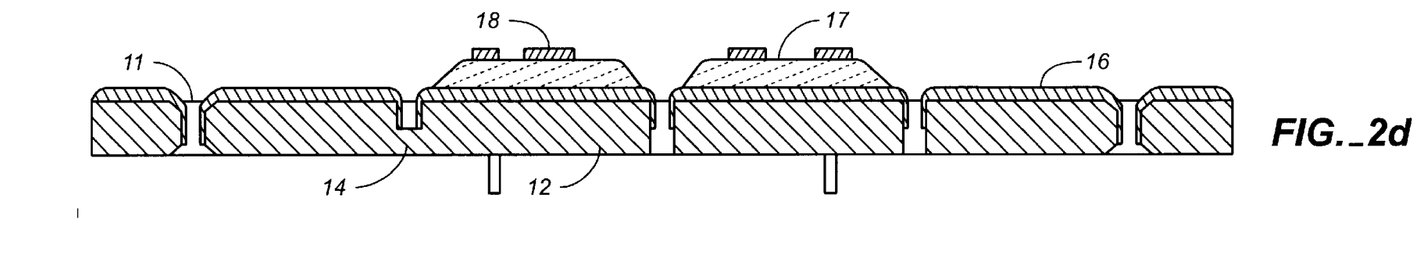

The primitive display plate (the shaped substrate 10) shown in FIGS. 1(c) and 2(c), which is formed as described above, comprises the pilot holes 11 serving as the positioning structure for positioning the primitive plate itself, and the display plate shape portion 12 formed at the predetermined position based on the pilot holes 11, and further comprises the ink-receiving layer 17 formed on the surface of the display plate shape portion 12. The pilot holes 11 facilitate positioning of the shaped substrate 10 and the display plate shape portion 12, and the presence of the ink-receiving layer 17 permits an appropriate printing system (simply referred to as "ink-jet printing" hereinafter) in which, like in printing on the surface of the ink-receiving layer 17 by using an ink jet printer, ink droplets are ejected to form a pattern. FIGS. 1(d) and 2(d) show the state in which a printed layer 18 is formed on the surface of the ink-receiving layer 17 by the ink-jet printing. The printed layer 18 may be formed on a portion of the surface of the display plate shape portion 12, formed over the entire surface thereof, or formed to extend from the surface of the display plate shape portion 12 to the surfaces of the tie bars 14 and the supporting portion 13. After the ink-jet printing, the tie bars 14 are cut by means of a simple tool such as a nipper or the like to separate the display plate shape portion 12 from the supporting portion 13.

Figure 3:
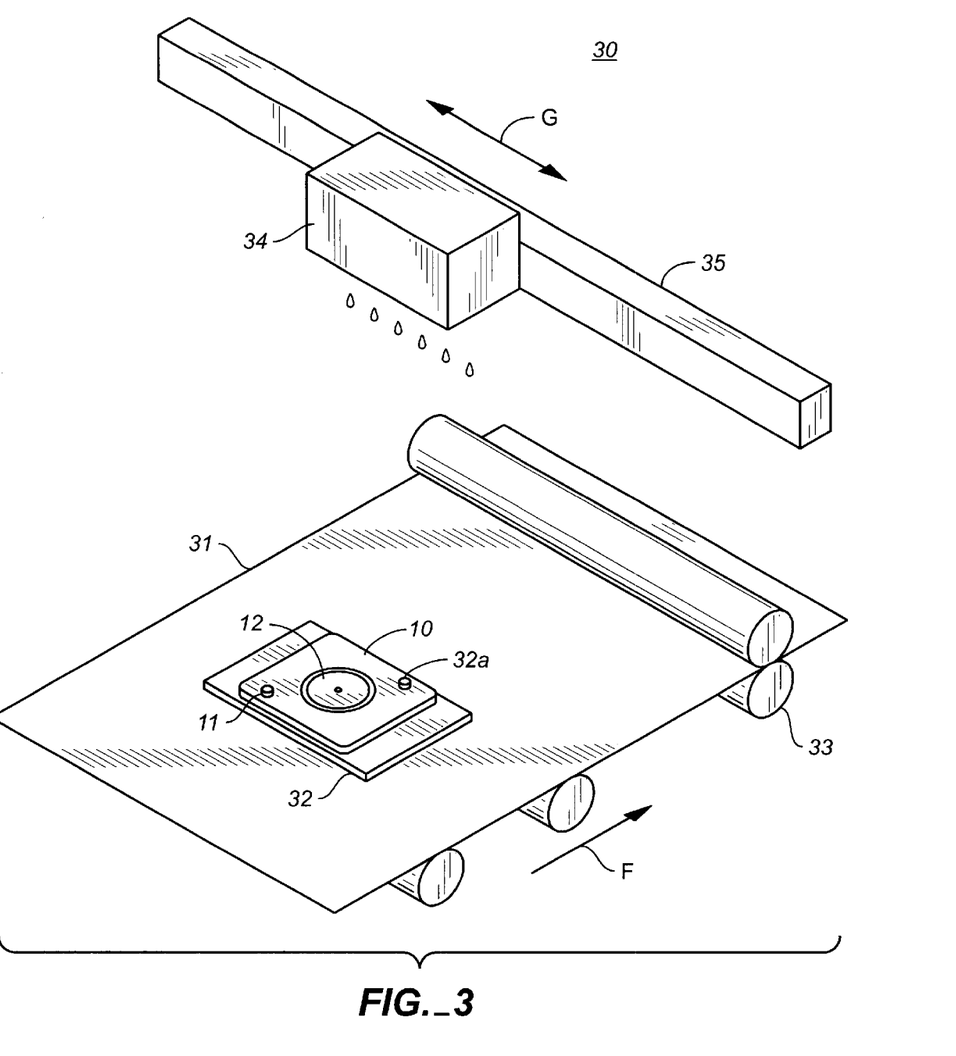
FIG. 3 is a schematic block diagram illustrating the schematic structure of a printing apparatus for ink jet printing.

FIG. 3 is a drawing schematically illustrating the schematic structure of an ink jet system printing apparatus 30 such as an ink jet printer. In the use of the printing apparatus 30, a positioning jig 32 is fixed on a sheet 31 comprising, for example, predetermined paper, by a bonding method or the like, and positioning pins 32a provided on the positioning jig 32 are inserted into the pilot holes 11 to position the shaped substrate 10 on the positioning jig 32. The printing apparatus 30 further comprises a feed mechanism 33 including feed rollers for feeding the sheet 31 in the direction of arrow F. On the other hand, an ink jet head 34 which can be moved in the direction of arrow G by a head driving mechanism 35 is arranged above the feed mechanism 33. The ink jet head 34 is a known one in which the volume of an ink chamber, not shown in the drawing, provided in the ink jet head 34 is reduced by, for example, deformation of an electrically driven piezo element to eject a part of the ink supplied to the ink chamber as ink droplets through a discharge nozzle, not shown in the drawing. One or a plurality of the ink chambers and the discharge nozzles corresponding to the chambers are provided, and particularly in color printing, a plurality of inks (for example, cyan, magenta, yellow, black) having color tones are supplied to the respective ink chambers so that ink droplets having a desired color tone can be appropriately discharged from the corresponding nozzle according to the print pattern.

In the case shown in FIG. 3, in the ink-jet printing, the printing position is set by detecting the position of the sheet 31 by an optical sensor of the printing apparatus 30 not shown in the drawing so that the feed mechanism 33 and the head driving mechanism 35 are operated according to the printing position to discharge ink droplets to the surface of the display plate shape portion 12. At this time, the shaped substrate 10 is positioned relative to the positioning jig 32 by engagement between the pilot holes 11 and the positioning pins 32a. Since the positioning jig 32 is fixed at the predetermined position relative to the sheet 31, the ink-jet printing is carried out with the display plate shape portion 12 positioned indirectly by the positioning jig 32 and the sheet 31. In this case, the positions of the pilot holes 11 of 16 the shaped substrate 10 may be grasped by recognizing an image input to an imaging device such as a CCD camera so that the feed mechanism 33 and the head driving mechanism 35 of the printing apparatus 30 are driven according to the data about the position.

Although ink in which any of various known dyes or pigments is dispersed can be used as an ink in the ink-jet printing, an ink in which a pigment is dispersed for improving the coloring property and the light resistance of a print pattern is preferably used as the ink for the watch dial or other dials. There are various inorganic pigments, organic pigments, etc. Examples of inorganic pigments include titanium oxide, iron oxide, and carbon black. Examples of organic pigments include azo pigments (azo lake, insoluble azo pigments, condensed azo pigments, chelate azo pigments, and the like), polycyclic pigments (for example, phthalocyanine pigments, perylene pigments, anthraquinone pigments, quinacridon pigments, dioxazine pigments, thioindigo pigments, isoindolinone pigments, quinofuran pigments), dye chelates (for example, basic dye type chelates, acid dye type chelates), nitro pigments, nitroso pigments, aniline black, and the like.

Any one of the above pigments is preferably added as a pigment dispersed solution to the ink, the dispersed solution being obtained by dispersing in an aqueous medium using a dispersant or a surfactant. As a preferred example of the dispersant, a conventional dispersant used for preparing a pigment dispersed solution, for example, a polymer dispersant can be used. The amount of the pigment added to the ink is preferably about 0.5% by weight to 25% by weight, and more preferably 2% by weight to 15% by weight. A pigment ink composition can be generally produced by adding predetermined amounts of a pigment, the dispersant, a solvent for imparting a moisturizing function, and mixing the resultant mixture by a dispersing machine such as a ball mill.

The above-described ink containing the pigment is printed on the surface of the ink-receiving layer 17 by the ink-jet printing to securely maintain the ink droplets at the adhesion positions, thereby obtaining excellent ink fixing properties (resistance to color blurring and ink separation) without deteriorating the color of the pigment. It is thus possible to form a good surface pattern, and obtain sufficient light resistance as a dial such as a watch dial.

After the ink-jet printing, the printed surface of the display plate shape portion 12 is preferably coated with a protecting film having light transmittance. The protecting film may be a film obtained by coating clear lacquer or the like on the display plate shape portion 12, or a light transmissive film previously formed and adhered to the printed surface. Also, the protecting film may be not completely transparent, and like a semitransparent plate or scatter plate, the protecting film may function to partially inhibit the travel of light. As a transparent coating material for forming the protecting film, an acrylic or cellulose clear lacquer, or the like can be used. Since the protecting film can improve the sealing performance for the printed surface, deterioration, discoloration, moisture absorption, etc. of the printed surface and a lower layer can be prevented.

Also, the surface of the display plate shape portion 12 may be subjected to additional surface treatment for display or decoration before or after the above-described step of forming the printed layer 18. In such surface treatment, in some cases, a member comprising display scales, numerical characters, characters, and other patterns, or a decorative member is fixed by adhesion, bonding, welding or the like. For example, a member comprising a conductor is formed in a predetermined planar pattern by electrodeposition, and held on a supporting sheet so that the member can be transferred to the surface of the display plate shape portion from the supporting sheet.

Furthermore, an adhesive layer is preferably formed on the back of the display plate shape portion 12, for adhering the display plate shape portion 12 to another member (for example, a movement of a watch), and the adhesive layer is preferably coated with a separating sheet. In this case, the separating sheet is separated from the manufactured dial so that it can easily be adhered to another member. The adhesive layer can be formed by using a known pressure-sensitive adhesive.

Next, the above-described ink-jet printing is carried out, and the display plate shape portion 12 on which the protecting film is formed according to demand is separated from the supporting portion 13 by cutting the tie bars 14 to obtain a watch dial. The tie bars 14 can be simply cut by using a tool such as a nipper.

Since the tie bars 14 are formed so that the surfaces thereof are lower than the surface of the display plate shape portion 12, no cut surface is formed on the surface side at the edge of the display plate shape portion 12, thereby preventing cutting damage (chipping, cracking, swelling, peeling, or the like) to the surface side portion at the edge of the display plate shape portion 12, thus hiding the raw material texture (the exposed portion of the raw material constituting the shaped substrate 10) of the display plate shape portion 12, which appears in the cut surface. In this case, since the surfaces of the tie bars 14 are lower than the surface of the display plate shape portion 12, any one of the coating layer 16, the ink-receiving layer 17, and the printed layer 18 can be formed to coat the outer edge side of the display plate shape portion 12 even at the edge of the display plate shape portion 12 connected to the tie bars 14, as shown in FIG. 2. In this case, the raw material of the shaped substrate 10 can be hidden at the edge of the watch dial after separation.

Although, in the above embodiment, the tie bars 14 are formed at the two diagonal positions on the periphery of the display plate shape portion 12, the tie bars 14 may be formed at three or more appropriate positions. By forming the tie bars 14 at a plurality of positions, the display plate shape portion 12 can stably remain connected to the supporting portion 13.

Next, the method of manufacturing a display apparatus (for example, a watch (wristwatch)) including the dial by using the primitive display plate (the shaped substrate 10) will be described in detail below. This manufacturing method comprises ink-jet printing on the display plate shape portion 12 of the primitive display plate, cutting the tie bars 14 to separate the dial, and then incorporating the dial into a display device to complete the display apparatus.

In accordance with an embodiment, the manufacturing method comprises forming the primitive display plate in the manufacturing place, moving the primitive display plate to a sales place together with the display apparatus before the dial is incorporated, or components of the display apparatus, appropriately IJ-printing on the display plate shape portion 12 in the sales place according to customer's demands, separating the dial in the sales place, and incorporating the dial into the display apparatus (or assembling the display apparatus using the dial and other components). In this case, only the primitive display plate is manufactured in the manufacturing place (a factory or the like), and an appropriate pattern can be formed on the display plate shape portion 12 in the sales place (a business point, a store, or the like) according to customer's demands to complete the display apparatus in the sales place. Therefore, it is possible to rapidly comply with the demands of customers, and minimize an increase in the manufacturing cost even in multi-kind and small-quantity production.

In this case, if data about the positional relation between the positioning structure such as the pilot holes 11 and the display plate shape portion 12 is input from the manufacturing place, printing can be carried out in the sales place while positioning the display plate shape portion by the positioning structure based on the positional relation data. Therefore, even when the size and shape of the dial are changed, or there are many kinds of sizes and shapes of dials, complicated calculation for positioning and a complicated positioning work process can be avoided. In this case, the outer shape (i.e., the outer shape of the shaped substrate 10) of the primitive display plate is preferably kept constant to facilitate handling in the sales place. In the present invention, the outer shape of the primitive display plate need not be kept constant as long as the positional relation between the positioning structure and the display plate shape portion is known.

Figure 4A:
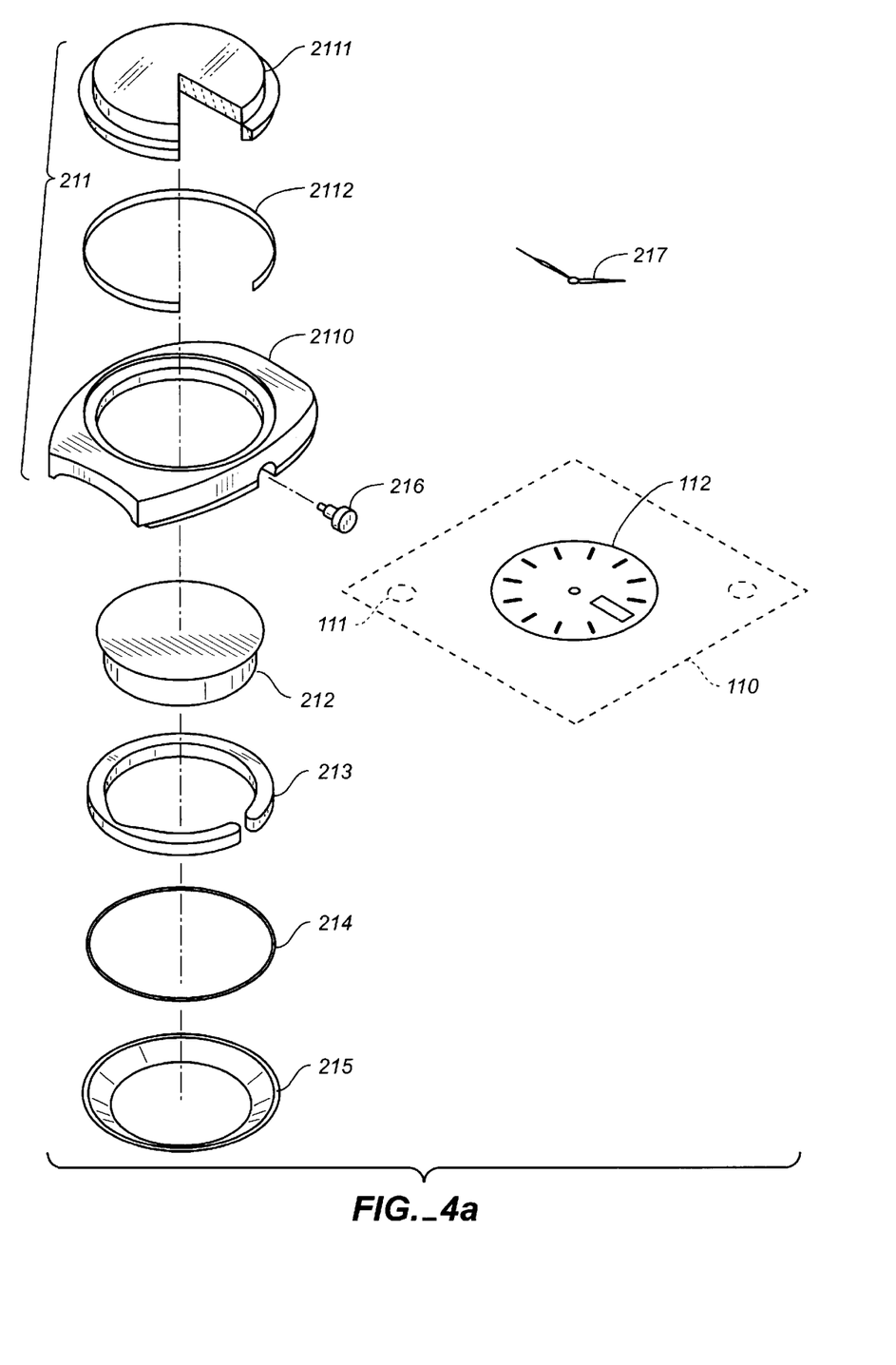
FIGS. 4(a) and (b) are schematic block diagrams illustrating the components as examples for manufacturing a wristwatch using the primitive display plate of the embodiment of the present invention.
Figure 4B:
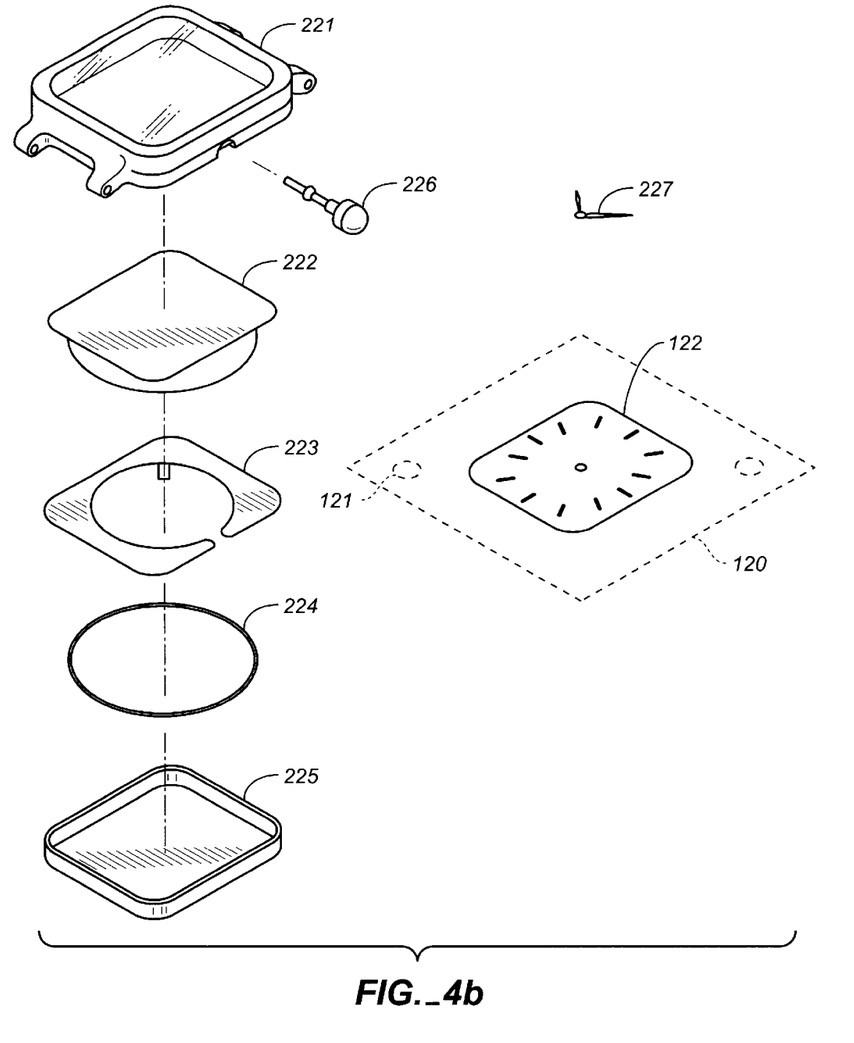

As shown in FIG. 4, in manufacturing a wristwatch, a primitive display plate 110 or 120 is manufactured from the shaped substrate 10 in the manufacturing place, and transferred to the sales place together with other components of the wristwatch, such as a watch case 211 (preferably previously incorporated into a case body 2110 by the method of pressing a window member 2111 through a plastic packing 2112 or the like in the same manufacturing place or a different manufacturing place), a movement 212, a case ring 213, a packing 214, a back cover 215, a crown with a winding stem 216, and a hand 217 (in the case of a practical use wristwatch), a watch case 221, a movement 222, a case ring 223, a packing 224, a back cover 225, a crown with a winding stem 226, and a hand 227 (in the case of a fashion wristwatch).

In the sales place, the ink-jet printing is carried out on the display plate shape portion 112 or 122 while positioning it relative to the primitive display plate 110 or 120 based on the positioning structure 111 or 121, and then the protecting film is formed, and a display member or decorative member is attached according to demand, followed by separation of the display plate shape portion 112 or 122 to form a dial. Then, each of the dials is assembled with other components to complete a wristwatch. This assembly comprises, for example, mounting the dial to the movement 212 or 222, attaching a hand 217 or 227 at the hand mounting portion (not shown) projecting from the movement 212 or 222 through the central hole 10c (FIG. 2) of the dial, incorporating the assembly into the watch case 211 or 221 together with the case ring 213 or 223, and then mounting the back cover 215 or 225 through the packing 214 or 224.

In the above-describe method, in the sales place, an appropriate pattern is printed on the display plate shape portion by inkjet printing according to the demands of customers. In this case, the pattern (including characters, symbols, any other planar shape) may be brought into from the customer, or appropriately selected from a plurality of previously set patterns by the customer or the worker in the sales place.

The procedure for printing the pattern by the ink-jet printing will be described below. When the pattern is not computerized (not converted into electronic data which can be read by a computer), the pattern brought into or selected as described above is converted into electronic data by image input means such as a scanner or a digital camera (CCD camera), and when the pattern is previously converted into electronic data, the data is input as a decorative image pattern to a computer. In this case, a display device (CRT, a liquid crystal display, or the like) is connected to the computer so that a display area A is set in the display device, for editing the print pattern of the dial in the form, for example, shown in FIG. 5.

Figure 5:
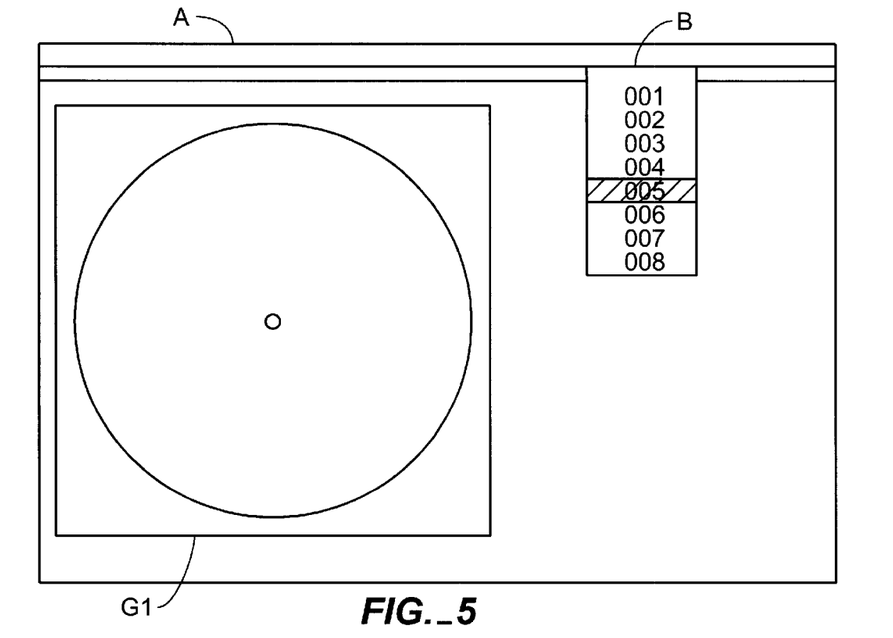
FIG. 5 is a schematic drawing schematically showing an editing screen in editing step 1 for forming printing data in accordance with the embodiment.
Figure 6:
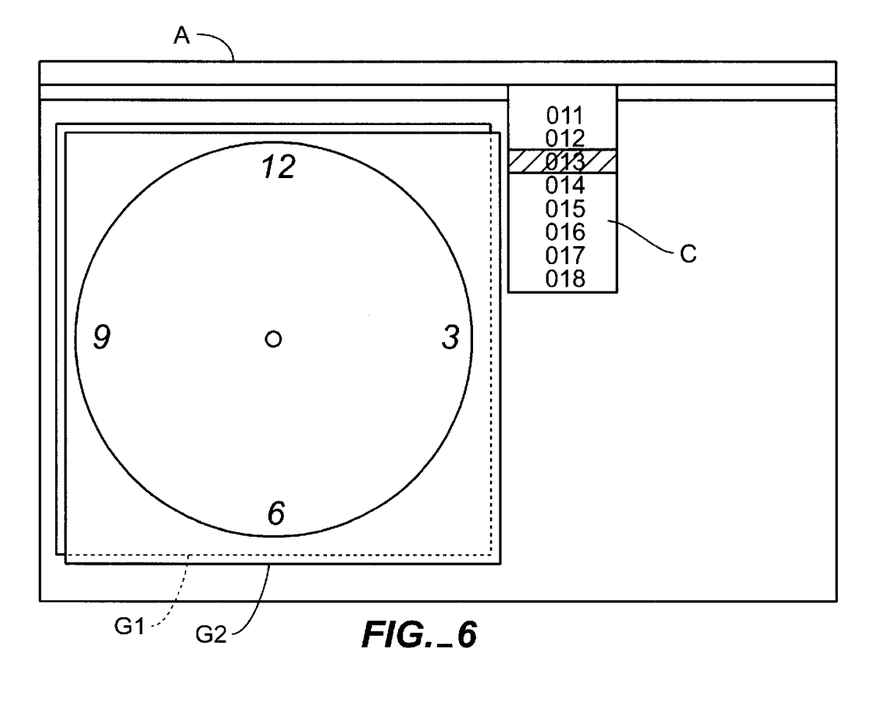
FIG. 6 is a schematic drawing schematically showing an editing screen in editing step 2 for forming printing data in accordance with the embodiment.

In the computer, a display plate shape pattern (i.e., the planar shape pattern of a dial to be formed) G1, which indicates the planar shape of the display plate shape portion 112 or 122, is previously stored as electronic data. The display plate shape pattern G1 includes, for example, the outer shape of a dial to be formed, and the shape of a central hole thereof. Particularly, in the use of a plurality of display plate shapes, as shown in FIG. 5, necessary data can be selected from electronic data about a plurality of the display plate shapes by an appropriate operation (for example, selecting any one from options displayed in operation region B which can be displayed in the display area A). In this embodiment, the selected display plate shape pattern G1 is displayed on the screen of the display device, as shown in FIG. 5. At this time, predetermined position information which is set so that the display plate shape pattern G1 displayed on the display screen agrees with the position of the display plate shape portion 12 fixed on the positioning jig 32 shown in FIG. 3 is prepared as position information data attached to the electronic data of the display plate shape pattern G1 or another position information file corresponding to a file of the electronic data.

In the computer, one or a plurality of electronic data about a shaped image pattern (for example, a character, scales, or a shaped pattern to be printed) G2 to be printed on the dial is previously stored, and particularly a plurality of data are stored so that the electronic data of the shaped image pattern G2 is selected by an appropriate operation (for example, by selecting any one from the options displayed in operation region C which can be displayed in the display area A). The selected shaped image pattern G2 can be appropriately superposed on the display plate shape pattern G1 displayed on the display screen.

At the same time, preferably, the size and positioning position of the shaped image pattern G2 can be automatically set in correspondence with the size and shape of the display plate shape pattern G1. For example, the shaped image pattern G2, i.e., the pattern magnification, is calculated according to the pattern size of the display plate shape pattern G1 to correct the size (for example, obtained by a file size or dimensional data previously stored as additional information in a file) of the pattern, and the positioning position of the shaped image pattern G2 is calculated in accordance with the pattern size of the display plate shape pattern G1 to perform positioning. Alternatively, positioning is performed so that a predetermined position (for example, the origin or center) of the shaped image pattern G2 agrees with the corresponding position (the origin or center) of the display plate shape pattern G1, whereby the shaped image pattern G2 can be automatically superposed on the display plate shape pattern G1.

The display plate shape pattern G1 and the shaped image pattern G2 may be previously formed as an integral display plate shape pattern. In this case, a plurality of patterns are preferably previously prepared by combinations of the display plate shape and shaped image patterns so that any one can be selected therefrom.

Figure 7:
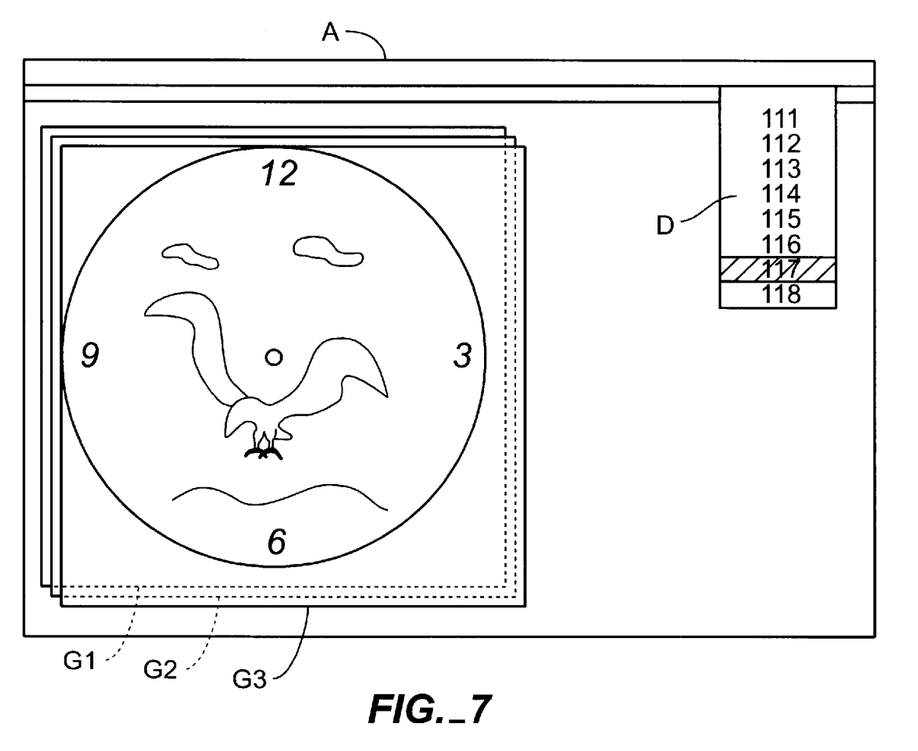
FIG. 7 is a schematic drawing schematically showing an editing screen in editing step 3 for forming printing data in accordance with the embodiment.

Next, the decorative image pattern G3 prepared as described above is superposed on the display plate shape pattern G1 and the shaped image pattern G2, as shown in FIG. 7. For the decorative image pattern G3, a plurality of data are preferably stored so that the electronic data of any one of the plurality of the decorative image patterns G3 is selected by another appropriate operation (for example, by selecting any one from the options displayed in operation region D which can be displayed in the display area A), and the selected decorative image pattern G3 can be appropriately superposed on the display plate shape pattern G1 and the shaped image pattern G2. The superposing work is preferably performed by freely controlling the size and position of the decorative image pattern G3.

However, particularly, the size and position of the decorative image pattern G3 can be automatically determined according to the size and position of the display plate shape pattern G1 and the shaped image pattern G2 in the same manner as described above.

The synthetic image pattern obtained by superposing the shaped image pattern G2 and the decorative image pattern G3 on the display plate shape pattern G1 as described above is stored as electronic data in the computer, or converted into print data and transmitted to the printing apparatus 30 shown in FIG. 3 without any processing. The print data transmitted to the printing apparatus 30 includes pattern data corresponding to the pattern contents of the synthetic image pattern, and position information data (generally the same as the position information of the display plate shape pattern G1) which indicates the position of the synthetic image pattern. The synthetic image pattern is printed by the printing apparatus 30 based on the print data according to the position of the actual display plate shape portion.

The primitive display plate, and the methods of manufacturing a display plate and a display device of the present invention are not limited to the above-described example (embodiment) shown in the drawings, and, of course, various changes can be made in the scope of the gist of the present invention.

Although, in the embodiment, a watch dial and a wristwatch comprising the dial are described as a typical example, the present invention can also be applied to display plates provided on decorative members and accessories, and display plates provided on display areas of various display devices. Also, the display device is not limited to a wristwatch and other watches; the present invention can also be applied to various measurement apparatuses, electronic apparatuses, mechanical apparatuses and devices, etc. Of course, the present invention can also be applied to a watch dial, a date dial for displaying dates through a window provided on the dial of a watch, as well as a day-of-week dial for displaying day of week.

Industrial Applicability

As described above, according to the present invention, a supporting portion comprising a positioning structure and a display plate shape portion comprising an ink-receiving layer provided on the surface thereof are integrally connected through a connecting portion to permit ink jet system printing in which ink droplets are ejected onto the display plate shape portion based on the positioning structure so that the display plate can be separated by cutting the connecting portion after printing. Therefore, an appropriate print pattern can be formed on the surface of the display plate without using a plate, thereby permitting the rapid manufacture of a display plate while keeping down the manufacturing cost even under conditions of multi-kind small-quantity production. By using the primitive display plate, printing and cutting of the connection portion can be performed by general-purpose small equipment without using special large manufacturing equipment. Therefore, a display plate can be manufactured in an appropriate place, thereby rapidly and flexibly complying with the demands of customers.

What is claimed is:

1. A primitive display plate comprising a supporting portion having a positioning structure, a display plate shape portion formed in a predetermined positional relation to the positioning structure and having a planar shape, a connecting portion that integrally connects the display plate shape portion and the supporting portion, and an ink-receiving layer formed on the surface of the display plate shape portion.

2. A primitive display plate according to claim 1, wherein a top surface of the connecting portion is lower than a top surface of the display plate shape portion.

3. A primitive display plate according to claim 1, wherein the ink-receiving layer is formed exclusive of the positioning structure.

4. A primitive display plate according to claim 1, further comprising a coating layer formed on a surface of the display plate shape portion, and wherein the ink-receiving layer is formed on the surface of the coating layer, and the ink-receiving layer is transparent or semitransparent.

5. A primitive display plate according to claim 1, wherein the positioning structure comprises a through hole formed in the supporting portion.

6. A primitive display plate according to claim 1, wherein the ink-receiving layer comprises a porous surface.

7. A primitive display plate according to claim 1, wherein the ink-receiving layer includes an absorbent material.

* * * * *